(12) United States Patent
Fliearman

(10) Patent No.: US 9,695,847 B2
(45) Date of Patent: Jul. 4, 2017

(54) STORAGE AND DELIVERY OF SUPPLEMENTAL POWER

(71) Applicant: DEERE & COMPANY, Moline, IL (US)

(72) Inventor: Steven R. Fliearman, Coffeyville, KS (US)

(73) Assignee: Deere & Company, Moline, IL (US)

( * ) Notice: Subject to any disclaimer, the term of this patent is extended or adjusted under 35 U.S.C. 154(b) by 361 days.

(21) Appl. No.: 14/463,466

(22) Filed: Aug. 19, 2014

(65) Prior Publication Data

US 2016/0053782 A1 Feb. 25, 2016

(51) Int. Cl.
| F16D 31/02 | (2006.01) |
| F15B 21/14 | (2006.01) |
| B60K 25/02 | (2006.01) |
| B60K 6/48 | (2007.10) |
| B60K 25/00 | (2006.01) |
| E02F 9/20 | (2006.01) |
| E02F 9/22 | (2006.01) |

(52) U.S. Cl.
CPC ............... *F15B 21/14* (2013.01); *B60K 6/48* (2013.01); *B60K 25/02* (2013.01); *B60K 2025/005* (2013.01); *B60W 2300/17* (2013.01); *E02F 9/202* (2013.01); *E02F 9/2075* (2013.01); *E02F 9/2217* (2013.01)

(58) Field of Classification Search
CPC .. F15B 11/024; B60K 24/02; B60K 2025/005
See application file for complete search history.

(56) References Cited

U.S. PATENT DOCUMENTS

| 3,903,696 A | 9/1975 | Carman |
| 4,227,587 A | 10/1980 | Carman |
| 4,382,484 A * | 5/1983 | Anderson ............... B60K 6/12 138/30 |
| 4,663,935 A | 5/1987 | Rohde |
| 2004/0118623 A1 | 6/2004 | Shore et al. |
| 2005/0166592 A1 | 8/2005 | Larson et al. |
| 2009/0055061 A1 * | 2/2009 | Zhu ......................... B60K 6/48 701/55 |
| 2013/0111890 A1* | 5/2013 | Rosth ...................... B66F 9/22 60/327 |

* cited by examiner

*Primary Examiner* — Thomas E Lazo
*Assistant Examiner* — Daniel Collins
(74) *Attorney, Agent, or Firm* — Lorenz & Kopf, LLP

(57) ABSTRACT

A power train and related vehicle are described for storage and delivery of supplemental power. A power conversion device may receive power from an engine or other component of a vehicle and may provide power to an energy storage device. A supplemental power device may receive power from the energy storage device and provide power to a supplemental power coupling via a one-way power transfer device. The supplemental power coupling may provide the power from the supplemental power device, as received via the one-way power transfer device, to a crank shaft or other component of the vehicle.

16 Claims, 6 Drawing Sheets

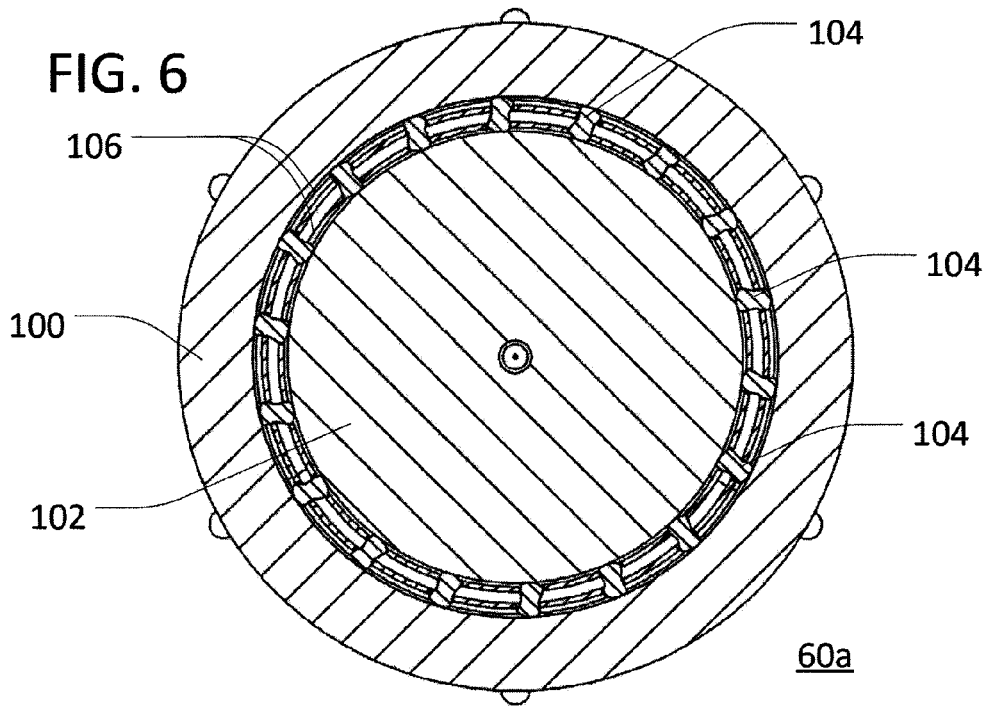
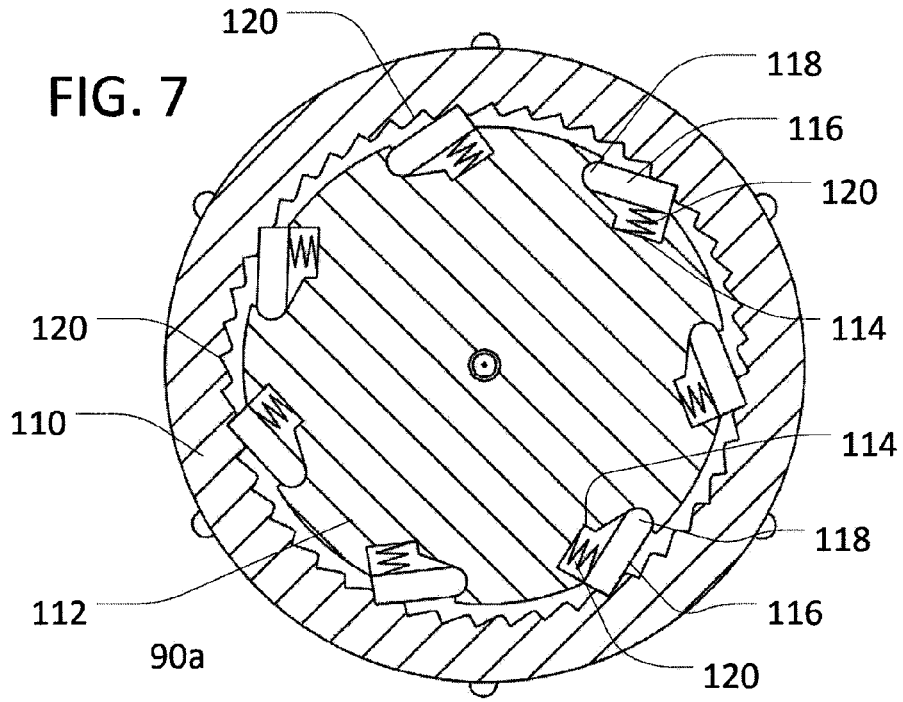

STORAGE AND DELIVERY OF SUPPLEMENTAL POWER

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to providing supplemental power to vehicle power trains and other machinery.

BACKGROUND OF THE DISCLOSURE

Design of vehicles and other platforms may sometimes include a trade-off between power needs and considerations of cost and space. In certain configurations, in order to manufacture a vehicle or other platform at an appropriate price and with a reasonable power train envelope, an engine may be utilized that does not provide fully optimal transient power response. For example, an engine may be provided for a work vehicle that is generally capable of satisfying the power needs of the vehicle during expected steady state operation (e.g., by providing appropriate speed and torque to the power train). Such an engine, however, may provide sub-optimal performance during certain transient events, such as vehicle acceleration, abrupt increase in vehicle loads, and so on. For example, an operator may experience a lag between a torque (or speed) command and delivery of the full commanded torque (or speed) by the engine, or the engine may struggle to provide a full commanded torque (or speed) at all.

SUMMARY OF THE DISCLOSURE

A power train and a vehicle for providing supplemental power storage and delivery are disclosed. According to one aspect of the disclosure, a power conversion device may receive power from an engine or other component of a vehicle and may provide power to an energy storage device. A supplemental power device may receive power from the energy storage device and provide power to a supplemental power coupling via a one-way power transfer device. The supplemental power coupling may provide the power from the supplemental power device, as received via the one-way power transfer device, to a crank shaft or other component of the vehicle.

In certain embodiments, the power conversion device and the supplemental power device may include continuously variable power sources, such as electrical or hydraulic machines. The energy storage device may include an electrical energy storage device, a hydraulic accumulator, or a mechanical energy storage device. The one-way power transfer device may include an over-running clutch, such as a mechanical diode or sprag clutch. The supplemental power coupling may include a plurality of gears, such as a planetary gear set.

The details of one or more implementations are set forth in the accompanying drawings and the description below. Other features and advantages will become apparent from the description, the drawings, and the claims.

BRIEF DESCRIPTION OF THE DRAWINGS

FIG. 6 is a cross-sectional view of a sprag clutch included in the power train of FIG. 3; and FIG. 7 is a cross-sectional view of a mechanical diode included in the power train of FIG. 4.

Like reference symbols in the various drawings indicate like elements.

DETAILED DESCRIPTION

Figure 1:
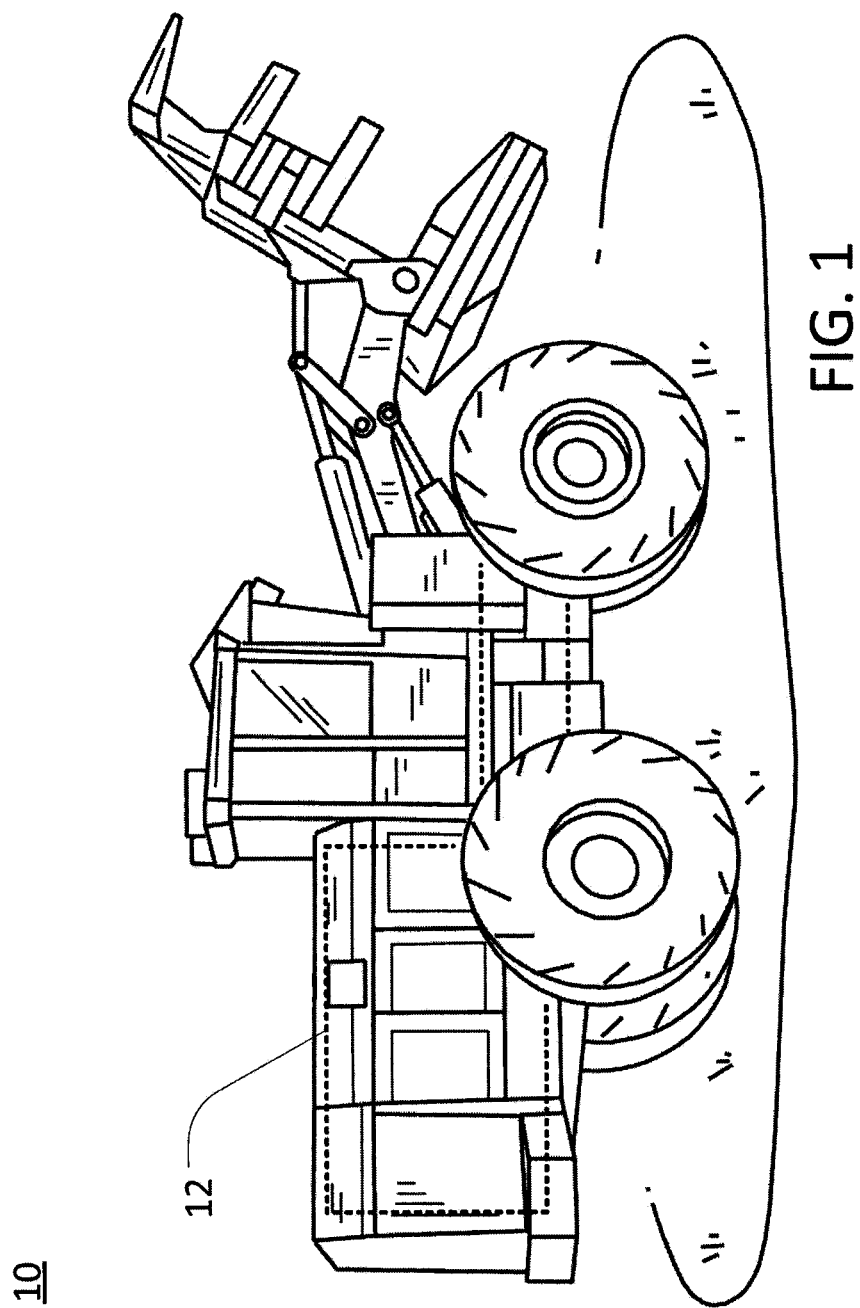
FIG. 1 is a perspective view of an example vehicle that may include a supplemental power system according to the present disclosure.

The following describes one or more example embodiments of the disclosed power train (or vehicle), as shown in the accompanying figures of the drawings described briefly above. Various modifications to the example embodiments may be contemplated by one of skill in the art.

As used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

Similarly, as used herein, "upstream" and "downstream" may be used to refer to a relative location with respect to the flow of power through (or as controlled by) various components. For example, if power is directed from an engine to a crank shaft, then through a clutch device to a power-shift transmission, such a clutch device may be viewed as downstream of the engine and upstream of the transmission (and, accordingly, as between the engine and the transmission). Likewise, such a transmission may be viewed as downstream of both the engine and the clutch device, and upstream of various components that receive power from the transmission (e.g., a differential, power take-off ("PTO") shaft, and so on).

Also as used herein, "direct" or "directly" may be used to indicate power transmission between two system elements without an intervening conversion of the power to another form. For example, power may be considered as "directly" transmitted by an engine to an output component if the power is transferred via a number of shafts, clutches, and gears (e.g., various spur, bevel, summing or other gears) without being converted to a different form by a continuously variable power source ("CVP") (e.g., without being converted to electrical or hydraulic power by an electrical generator or a hydraulic pump). In certain configurations, fluidic transfer of rotational power by a torque converter may also be considered "direct."

In contrast, power may not be considered as "directly" transmitted between two system elements if some portion of the power is converted to another form during transmission. For example, power may not be considered as "directly" transmitted between an engine and an output component if a portion of the engine's power is converted to a different form by a CVP, even if that portion is later reconverted to rotational power (e.g., by another CVP) and then recombined with the unconverted engine power (e.g., by a summing planetary gear or other summing assembly)

As noted above, in various vehicles or other platforms, existing engine and power train configurations may exhibit undesirable performance in response to transient events. For example, in certain conditions, when an operator commands (or circumstances otherwise require) an increase in wheel speed or torque, an undesirable lag may occur before the desired speed or torque is achieved. In certain embodiments, a vehicle or other platform may even fail to achieve the commanded (or otherwise required) wheel speed or torque. These deficiencies, for example, may result from a relevant engine lacking the necessary power capacity to effectively address the noted transient events. Accordingly, it may be useful to provide a system for storage and delivery of supplemental power, in response to transient vehicle (or other platform) events. (Various examples below may specifically address vehicle applications. It will be understood, however, that other applications may also be possible.)

In certain embodiments, for example, a portion of power from a vehicle may be diverted for storage in an energy storage device. This diverted power may be drawn from the engine itself or from various other components of the vehicle. For example, a geared connection may be provided with a crank shaft receiving power from the engine, through which a portion of power from the engine may be diverted for storage in the energy storage device. Similarly, a connection may be provided with a regenerative braking or other system, whereby power may additionally (or alternatively) be diverted to the energy storage device.

Energy may be stored in an energy storage device in a variety of forms, including electrical energy, hydraulic energy (i.e., stored pressure), or mechanical. Accordingly, an energy storage device and associated control equipment may take a variety of forms including an electrical (e.g., a battery assembly), hydraulic (e.g., a hydraulic accumulator), or mechanical (e.g., a flywheel assembly). In certain embodiments, a power conversion device may receive mechanical power from the engine (or other vehicle components) and convert the power to a storable form. For example, a CVP in the form of an electrical generator or a hydraulic pump may receive mechanical power from the engine (or other vehicle components) and convert the power to electrical or hydraulic form. Similarly, a power conversion device for mechanical storage of power may convert received power to the appropriate mechanical form. For example, a power conversion device for flywheel storage may receive mechanical power from the engine (or other vehicle components) and convert the received power to an appropriately high-speed mechanical rotation for the flywheel.

When the vehicle encounters a transient demand (or in various other instances), energy from the energy storage may then be released, in order to provide supplemental power to the vehicle (i.e., power in addition to that provided by the engine). For example, upon an operator commanding a high torque operation, energy may be routed from the energy storage device to downstream components of the power train in order to reduce any lag or other deficiency in delivery of the commanded torque.

In certain embodiments, energy from the energy storage device may be routed through one or more intermediary supplemental power devices for conversion of the power from the stored form to appropriate mechanical power. For example, where energy is stored in an energy storage device in electrical or hydraulic form, an electrical machine acting as a motor or a hydraulic motor may convert the stored energy to mechanical power. Similarly, where energy is stored in a mechanical form, an appropriate mechanical conversion may occur. For example, a supplemental power device paired with flywheel storage may receive mechanical power from the flywheel and convert the received power to a lower-speed mechanical rotation.

In order to provide a relatively low-loss coupling between the supplemental power device and downstream components of the power train, a supplemental power coupling and a one-way power transfer device may also be provided. A supplemental power coupling may take a variety of forms, as appropriate for combining power from the supplemental power source and the engine. For example, a summing or other gear set attached to a crank shaft or other power train components may receive power from both the engine and the supplemental power source and provide a combined power output to downstream components of the power train. In certain embodiments, a planetary gear set may be utilized to sum power from the engine and the supplemental power source.

A one-way power transfer device may also take a variety of forms, as appropriate for allowing power to flow from the supplemental power source through the transfer device to the downstream components of the power train (i.e., to provide supplemental power to those components), but not from the downstream components of the power train through the transfer device to the supplemental power source (i.e., as would tend to back-drive the supplemental power source). In certain embodiments, a one-way power transfer device may be a one-way or over-running clutch device, such as a sprag clutch, mechanical diode, or other similar device. In certain embodiments, a one-way power transfer device may be a wet clutch configured to engage for power transmission only when the supplemental power source is being utilized.

As will become apparent from the discussion herein, the disclosed supplemental power system may be used advantageously in a variety of settings and with a variety of machinery. For example, referring now to FIG. 1, an example of the disclosed system may be included in a vehicle 10. In FIG. 1, the vehicle 10 is depicted as a wheeled feller-buncher with a power train 12. It will be understood, however, that other configurations may be possible, including configurations with vehicle 10 as a different kind of feller-buncher, a harvester, a log skidder, a grader, a tractor or one of various other work vehicle types. It will further be understood that the disclosed systems may also be used in non-work vehicles and non-vehicle applications (e.g., fixed-location power installations).

Figure 2:
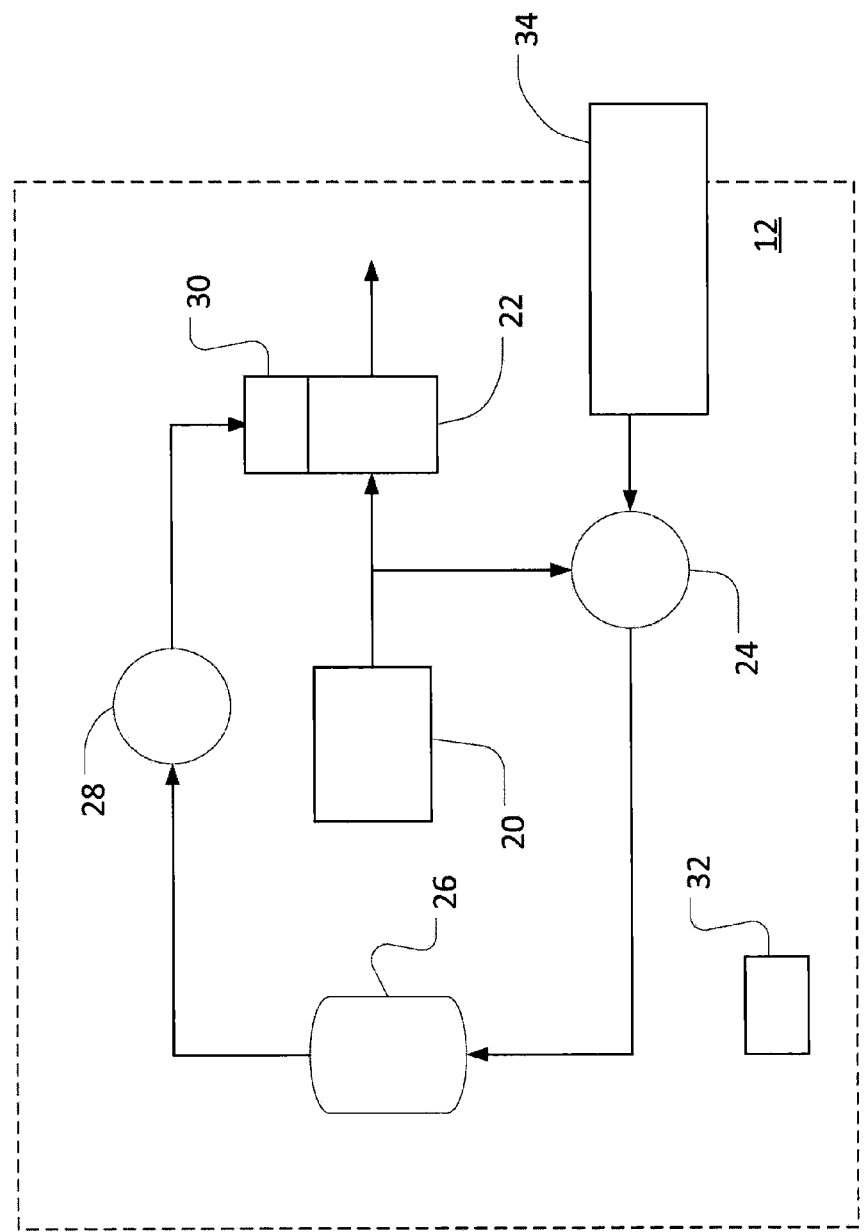
FIG. 2 is a schematic view of an example power train of the example vehicle of FIG. 1.

Referring also to FIG. 2, various components of the power train 12 are depicted, with arrows generally indicating the flow of power between the components. The power train 12 may include an engine 20, which may be an internal combustion engine of various known configurations. The engine 20 may generally provide power to supplemental power coupling 22 and to power conversion device 24. As noted above, supplemental power coupling 22 may take a variety of forms (e.g., a summing or other gear set) as may power conversion device 24 (e.g., an electrical or hydraulic machine). Power may be provided to these components (or others) from the engine 20 directly or indirectly, including with a variety of intervening shafts, gears, clutches, and so on.

In certain embodiments, power may always be provided to the power conversion device 24 from the engine 20 (or from other components of the vehicle 10) for conversion and storage. In certain embodiments, power may be routed to the power conversion device 24 selectively. For example, a controller 32 (e.g., a computing device integrated with the transmission control unit ("TCU") (not shown) of the vehicle 10) may determine when excess power is available from the engine 20 (or other vehicle components) and may, at those times, route a portion of power from the engine 20 (or other components) to the power conversion device 24. For example, a clutch device or other control device (not shown) in communication with the controller 32 may be interposed between the engine 20 and the power conversion device 24 (or between various other components) in order to control the flow of power between those components (e.g., to controllably prevent such power flow). The controller 32 (or another controller) may additionally (or alternatively) control various other functions of the disclosed system, including the storage and release of energy by the energy storage device 26.

Power received from the engine 20 at the power conversion device 24 may be converted by the power conversion device 24 to a different form, then transmitted to energy storage device 26 for storage. As noted above, the power conversion device 24 may take a variety of forms, including various electrical, hydraulic, or mechanical devices. In certain embodiments, the power conversion device 24 may additionally (or alternatively) receive power from components of the vehicle 10 other than the engine 20. For example, a regenerative braking system 34 or other system may provide power to the power conversion device 24 for conversion to an appropriate form for storage.

Energy from the power conversion device 24 may be stored in the energy storage device 26 until controller 32 determines that supplemental power is needed for components of the power train 12, at which point the energy may be released to a supplemental power device 28. For example, if an operator commands a particular torque for the vehicle 10, controller 32 may determine (e.g., based on data from various sensors (not shown), analysis of various look-up tables, and so on) that supplemental power will be needed to provide the commanded torque without an unacceptable lag. Accordingly, controller 32 may cause the release of energy from the energy storage device 26 to the power conversion device 28.

In order to provide supplemental power to downstream components of the power train 12, the supplemental power device 28 may convert power received from the energy storage device 26 into mechanical form suitable for those downstream components. As with the power conversion device 24, the supplemental power device 28 may take a variety of forms, including various electrical, hydraulic, or mechanical devices. In certain embodiments, the particular form of a particular supplemental power device 28 may correspond to the form in which energy is stored in the energy storage device 26. For example, if the energy storage device 26 is an electrical battery, the supplemental power device 28 may be an electrical machine operating as a motor. If the energy storage device 26 is a hydraulic accumulator, the supplemental power device 28 may be a hydraulic motor. If the energy storage device 26 is a flywheel, the supplemental power device 28 may be a mechanical device for providing a reduced-speed mechanical output, as compared to the potentially high-speed rotation of the flywheel.

In order to provide supplemental power to components of the power train 12 without excessive windage losses, back-driving of the supplemental power device 28, or other undesirable effects, a one-way power transfer device 30 may be provided between the supplemental power device 28 and various downstream components of the power train 12. As depicted, for example, power may flow from the supplemental power device 28 to the one-way power transfer device 30, then into the supplemental power coupling 22 in order to be combined with the output from the engine 20. The one-way power transfer device 30, however, may not permit power to flow in the reverse direction (i.e., from the supplemental power coupling 22, through the one-way power transfer device 30, to the supplemental power device 28). In certain embodiments, the one-way power transfer device 28 may be a one-way or over-running clutch, such as a sprag clutch (FIG. 6) or mechanical diode (FIG. 7). In certain embodiments, the one-way power transfer device 28 may be a wet clutch controlled (e.g., by the controller 32) to engage only when power is being provided to components of the power train 12 by the supplemental power device 28.

The supplemental power coupling 22 may also take a variety of forms, and may engage with various components of the power train 12. In certain embodiments, the coupling 22 may engage with a crank shaft powered by the engine 20, in order to provide supplemental power directly to the crank shaft. For example, the coupling 22 may include a spur gear in communication with (e.g., fixed to) the crank shaft that engages with another gear in communication with (e.g., fixed to) the one-way power transfer device 28. In certain embodiments, the coupling 22 may engage with other components of the power train 12. For example, the coupling 22 may engage with an input component of a downstream transmission (see, e.g., FIG. 4), such that supplemental power is provided directly to the transmission.

Figure 3:
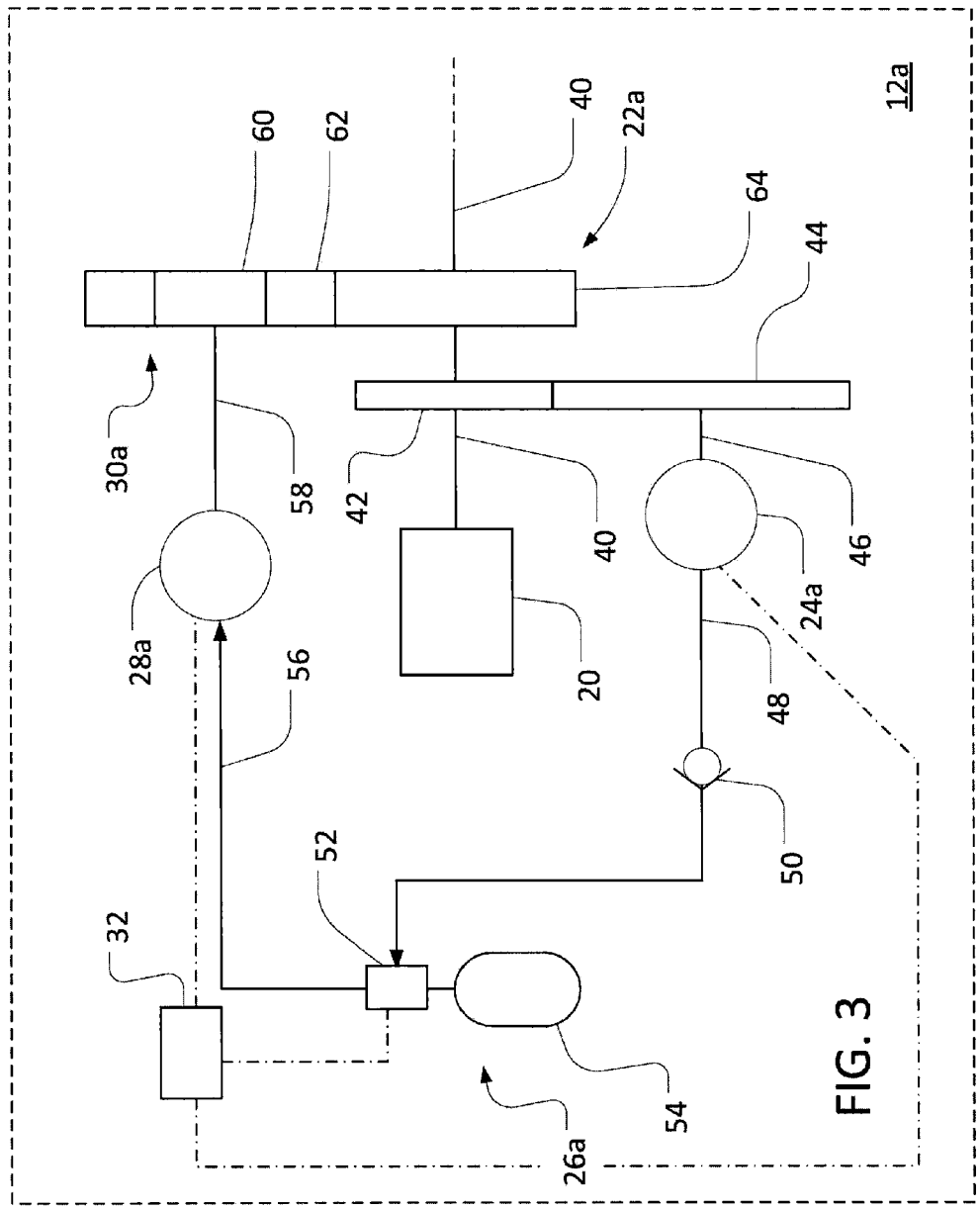
FIG. 3 is a schematic view of another example power train of the example vehicle of FIG. 1.

Referring now to FIG. 3, an example configuration of power train 12a is depicted with a hydraulic supplemental power system. The power train 12a may include the engine 20, which may generally provide power to a crank shaft 40. Spur gears 42 and 64 may be mounted to the crank shaft 40, with the spur gear 64 forming part of a supplemental power coupling 22a of the power train 12a. (It will be understood, in this and other configurations, that various intermediary shafts, gears, and other components may be employed for transmission of power between the various depicted (and other) components. Similarly, other connections of various known types may be utilized in place of the various depicted shafts, gears, and so on.)

Another spur gear 44 may mesh with the crank shaft spur gear 42 in order to provide power, via an input shaft 46, to a hydraulic pump 24a. In this way, a portion of the rotational power from the engine 20 may be routed to the hydraulic pump 24a for conversion to hydraulic power. As noted above, this routing of power may be controlled by the controller 32 or various other devices (not shown). In certain embodiments, for example, a clutch (not shown) may be provided to selectively engage the gear 42 with the crankshaft 40 or to selectively engage the gear 44 with the input shaft 46. Through control of such a clutch (e.g., via the controller 32), the flow of power from crankshaft 40 to input shaft 46 may be regulated. This may be useful to ensure that a portion of power is diverted from the engine 20 to the hydraulic pump 24a only when the engine 20 has sufficient spare capacity with respect to the current operations of the vehicle 10. For example, it may be useful for controller 32 to prevent routing of power from the engine 20 to the hydraulic pump 24a when the current operation of vehicle 10 requires a substantial portion of the engine's capacity.

During operation of the hydraulic pump 24a, pressurized hydraulic fluid from the hydraulic pump 24a may flow along a hydraulic line 48, through a check valve 50. A control valve 52 (or similar device) of various known configurations may selectively and controllably route the flow into a hydraulic accumulator 54 for storage, or through hydraulic line 56 to a hydraulic motor 28a (e.g., as may be useful for operation of the power train 12a in a split-path mode employing both an engine and a CVP). Control of this routing may, again, be effected by the controller 32 (or by various other devices). The hydraulic accumulator 54 and the control valve 52 may take any variety of known forms, as may be appropriate for the power and envelope requirements of the vehicle 10.

When supplemental power is needed for downstream components of the power train 12a, hydraulic pressure may be released from the hydraulic accumulator 54 to the hydraulic motor 28a via the control valve 52 and the hydraulic line 56. The hydraulic motor 28a may then drive the rotation of an output shaft 58. A one-way power transfer device 30a, such as a one-way clutch 60, may be oriented between the output shaft 58 and the crank shaft gear 64 in order to ensure that power may only flow from the output shaft 58 to the cranks shaft 40, and not in the reverse direction. As depicted, for example, the one-way clutch 60 may engage the crank shaft gear 64 via another gear 62, which may also be considered part of the supplemental power coupling 22a.

The one-way clutch 60 (or a similar device) may regulate one-way flow of power in various ways. In certain embodiments, as described in greater detail below, the one-way clutch 60 may be configured to allow transfer of power between an inner race and an outer race of the clutch 60 (not shown in FIG. 3) when both of the races rotate in one direction, but not when one or both of the races rotates in the opposite direction. In this way, rotational power may be transmitted from the output shaft 58 through the clutch 60 to the crank shaft 40 (e.g., via the gears 62 and 64) when the output shaft 58 rotates in a positive direction, but may not transmitted from the crank shaft 40 through the clutch 60 to the output shaft 58 when the crank shaft 40 rotates in the opposite direction. As noted above, this may allow for the hydraulic motor 28a to provide supplemental power to various downstream components of the power train 12a (e.g., the crank shaft 40), while preventing the back-driving of the motor 28a by those components. The particular speed with which the hydraulic motor 28a rotates the output shaft 58 may be controlled as appropriate by the controller 32.

Figure 4:
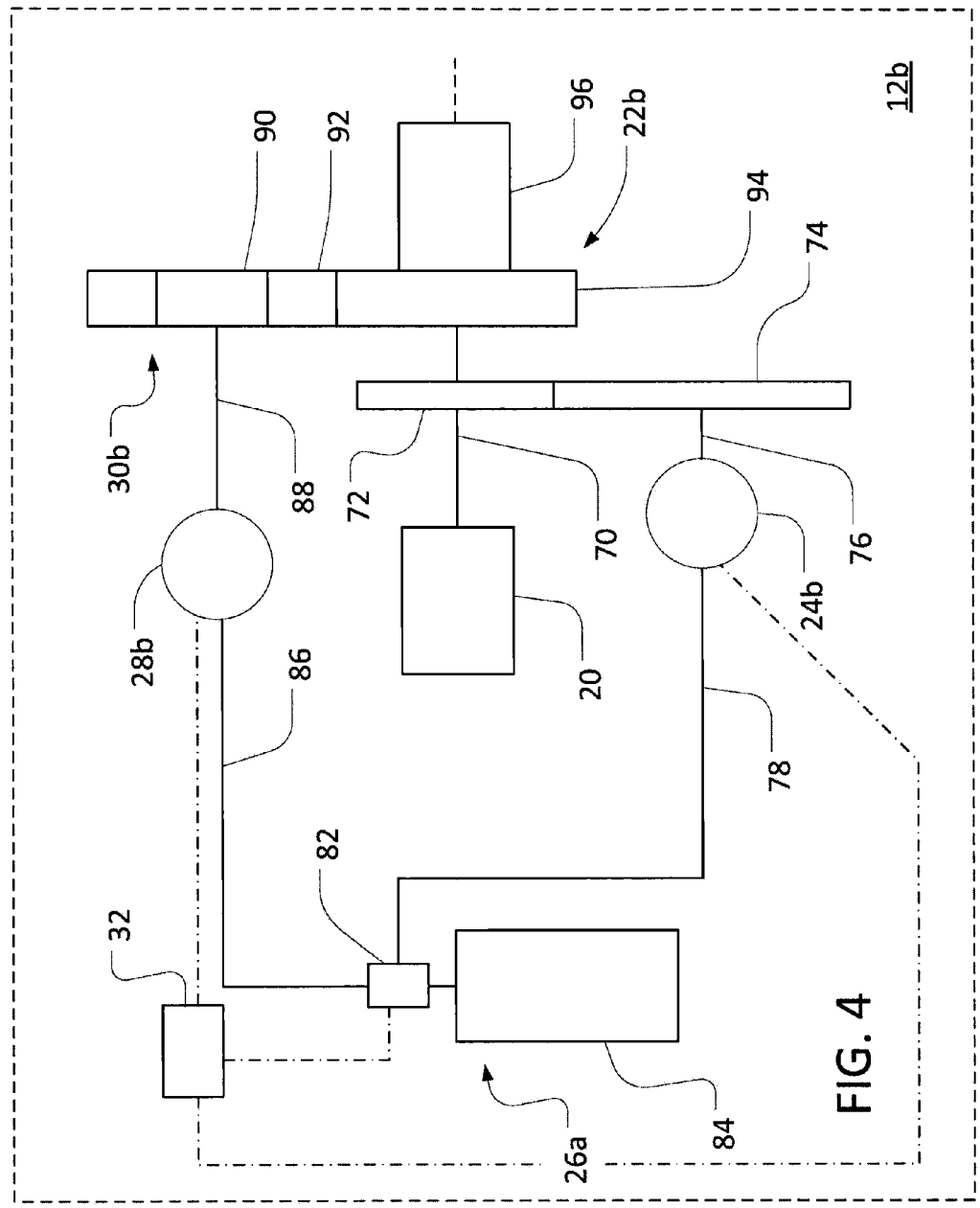
FIG. 4 is a schematic view of yet another example power train of the example vehicle of FIG. 1.

Referring now to FIG. 4, an example configuration of power train 12b is depicted with an electrical supplemental power system. The power train 12b may include the engine 20, which may generally provide power to a crank shaft 70. Spur gear 72 may be mounted to the crank shaft 70, and the crank shaft 70 may generally direct power from the engine 20 to a downstream power-shift transmission 96 (or various other power train components).

Another spur gear 74 may mesh with the crank shaft spur gear 72 in order to provide power, via input shaft 76, to an electrical machine 24b, which may accordingly act as an electrical generator. In this way, a portion of the rotational power from the engine 20 may be routed to the electrical machine 24b for conversion to electrical power. As noted above, this routing of power may be controlled by the controller 32 (or various other devices). In certain embodiments, a clutch device (not shown) or similar mechanism may be provided to selectively couple the gear 72 to the crankshaft 70 or the gear 74 to the input shaft 76. Through control of such a clutch (e.g., via the controller 32), the flow of power from crankshaft 70 to input shaft 76 may be appropriately regulated. This may be useful, for example, to ensure that a portion of power is diverted from the engine 20 to the electrical machine 24b only when the engine 20 has sufficient spare capacity with respect to the current operations of the vehicle 10. For example, it may be useful for the controller 32 to prevent routing of power from the engine 20 to the electrical machine 24b when the current operation of vehicle 10 requires a substantial portion of the engine's capacity.

During operation of the electrical machine 24b, electrical current from the electrical machine 24b may flow along an electrical line 78. A control circuit 82 (or similar device) of various known configurations may selectively route the current into an electrical storage device 84 for storage, or directly through electrical line 86 to a electrical machine 28b (e.g., as may be useful for operation of the power train 12a in a split-path mode employing both an engine and a CVP). Control of this routing may, again, be effected by the controller 32 (or by various other devices). The electrical storage device 84 may take any variety of known forms, including battery assemblies, capacitor or super-capacitor assemblies, and so on, as may be appropriate for the power and envelope requirements of the vehicle 10.

When supplemental power is needed for downstream components of the power train 12b, electrical energy may be released from the electrical storage device 84 to the electrical machine 28b via the control circuit 82 and the electrical line 86. The electrical machine 28b may then operate as a motor in order to drive the rotation of an output shaft 88. A one-way power transfer device 30b, such as mechanical diode 90 may be oriented between the output shaft 88 and the supplemental power coupling 22b. The mechanical diode 90 may be configured, as described in greater detail below, to allow transfer of power between an inner race and an outer race of the mechanical diode 90 (not shown in FIG. 4) through rotation of the races in one direction, but not through rotation of the races in the opposite direction. Accordingly, the mechanical diode 90 may be configured such that rotational power may be transmitted from the output shaft 88 through the mechanical diode 90 to the supplemental power coupling 22b, (e.g., via a gear 92 engaging or integrated with an outer race of the mechanical diode 90), but not transmitted from the supplemental power coupling 22b through the mechanical diode 90 to the output shaft 88. As noted above, this may allow for the electrical machine 28b to provide supplemental power to various downstream components of the power train 12b (e.g., the transmission 96), while preventing the back-driving of the electrical machine 28b by those components. The particular speed with which the electrical machine 28b rotates the output shaft 88 may be controlled as appropriate by the controller 32.

Figure 5:
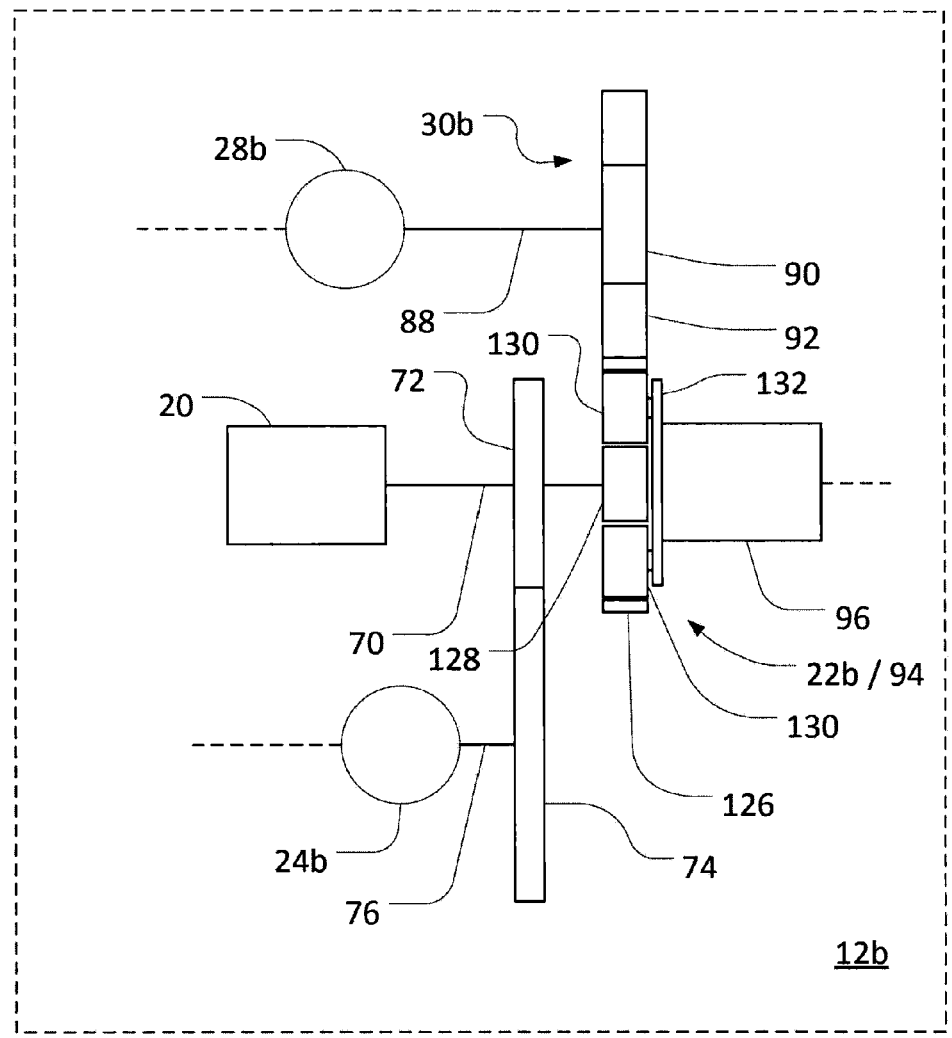
FIG. 5 is a detailed schematic view of aspects of the power train of FIG. 4.

In certain embodiments, as noted above, a supplemental power coupling 22 may be a gear set having one of various types of configurations. Referring also to FIG. 5, for example, the supplemental power coupling 22b may include a summing planetary gear set 94. In the embodiment depicted, the gear 92 may be driven by the electrical machine 28b via the mechanical diode 90, and the gear 92, in turn, may drive a ring gear 126 of the planetary gear set 94. A sun gear 128 of the planetary gear set may be configured to receive power from the crank shaft 70 and a planet carrier 132 of the planetary gear set may be configured to provide power to the transmission 96. Accordingly, power provided to the sun gear 128 (by the engine 20) and to the ring gear 126 (by the electrical machine 28*b*) may be summed via planet gears 130 for output, via the planet carrier 132, to the transmission 96. It will be understood that various brakes, clutches, and other similar devices (not shown) may be provided to appropriately control the movement of the ring gear 126, sun gear 128 and planet carrier 132, or various other relevant components. For example, a brake device (not shown) may be provided to brake the rotation of the ring gear 126 when only the engine 20 (and not the electrical machine 28*b*) is providing power to the transmission 96.

As noted above, one-way power transfer devices (e.g., one-way clutches) may facilitate the transmission of rotational power in one rotational direction (e.g., clockwise) to a particular rotating element, while permitting free rotation of the rotating element in the other rotational direction (e.g., counterclockwise). Such devices may be configured in a variety of ways, as is known in the art, including as sprag clutches, mechanical diodes, and so on.

Referring also to FIG. 6, in certain embodiments, a one-way power transfer device (e.g., device 60 of FIG. 2) may include a sprag clutch 60*a*. The sprag clutch 60*a*, as is known in the art, may typically include a rotatable outer race 100 and a rotatable inner race 102, with various sprags 104 providing a mechanical connection between the inner and outer races 102 and 100. In certain configurations, the sprags 104 may further be nested in one or more spring cages 106 running between the inner and outer races 102 and 100. Each of the sprags 104 may be configured to pivot around an individual axis and may be shaped such that when a first of the races (e.g., the outer race 100) is rotated in one direction with respect to the second race (e.g., the inner race 102) (or vice versa), the sprags 104 physically engage both races. Accordingly, the sprags 104 may transmit force from the first race to the second race, causing the second race to rotate in the same direction as the first (i.e., transmitting rotational power from the first to the second race). In contrast, when the first race is rotated in the opposite direction with respect to the second race (or vice versa), the sprags 104 may pivot away from the races 100 and 102, thereby preventing transmission of rotational power from the first race to the second race and allowing the first race to rotate relatively freely, with respect to the second race.

In the power train 12*a* (see FIG. 3), for example, the output shaft 58 may engage the inner race 102 of the sprag clutch 60*a*, and the outer race 100 of the sprag clutch 60*a* may engage the gear 62. Accordingly, through appropriate rotation of the output shaft 58 by the hydraulic motor 28*a*, rotational power may be transmitted through the sprag clutch 60*a* to the gear 62 and the crank shaft 40. The configuration of the sprag clutch 60*a*, however, may prevent rotational power from being transmitted in the opposite direction, thereby preventing the back-driving of the hydraulic motor 28*a* and associated losses.

It will be understood that various other configurations may be possible. For example, the output shaft 58 may engage an outer race of a sprag clutch (or other one-way power transfer device) for rotation, with an inner race of the sprag clutch (or other device) engaging the gear 64.

Referring also to FIG. 7, in certain embodiments, a one-way power transfer device (e.g., device 90 of FIG. 3) may include a mechanical diode 90*a*. The mechanical diode 90*a*, as is known in the art, may include two rotatable rings 110 and 112 with various rigid struts 116 oriented between the rings 110 and 112. As depicted, the ring 112 may be considered a pocket ring with various pockets 114. One end of a rigid strut 116 may be pivotably mounted within each of the pockets 114, with the struts 116 being biased to rotate away from the pocket ring 112 (e.g., via various springs 120). Also as depicted, the ring 110 may be considered a notch ring, and may include various notches 120 respectively configured to receive a portion of the various struts 116 (e.g., a portion of a strut 116 opposite the strut's pivot point 118). The two rings 110 and 112 may be configured such that if the notch ring 110 rotates in one direction with respect to the pocket ring 112 (or vice versa) the biased struts 116 engage with the notches 120 and thereby transmit rotational power between the rings 110 and 112. However, if the notch ring 110 rotates in the opposite direction with respect to the pocket ring 112 (or vice versa) the biased struts are pivoted away from the notch ring 110 (i.e., toward the pocket ring 112), do not engage with the notches, and thereby do not transmit rotational power between the rings 110 and 112.

In the power train 12*b* (see FIGS. 4 and 5), for example, the output shaft 88 may engage the inner ring 112 of the mechanical diode 90*a*, and the outer ring 110 of the mechanical diode 90*a* may engage (e.g., via the intermediary (or integral) gear 92) the ring gear 126 of the planetary gear set 94. Accordingly, through appropriate rotation of the output shaft 88 by the electrical machine 28*b*, rotational power may be transmitted through the mechanical diode 90*a* to the gear set 94 and the transmission 96. The configuration of the mechanical diode 90*a*, however, may prevent rotational power from being transmitted in the opposite direction, thereby preventing the back-driving of the electrical machine 28*b* and associated losses.

It will be understood that various other configurations may be possible. For example, the output shaft 88 may engage an outer ring of a mechanical diode (or other one-way power transfer device) for rotation, with an inner ring of the mechanical diode (or other device) engaging the planetary gear set 94.

Supplemental power may be provided to downstream components the power train 12 at various power levels and with various timings, as controlled by the controller 32. For example, in certain applications, it may be useful to ramp up the delivery of supplemental power, in order to provide a smooth transition from engine-only power to the combination of engine and supplemental power. As such, the controller 32 may direct the gradually increasing release of energy from the energy storage device 26 and, accordingly, a gradually increasing supply of power from the supplemental power device 28 to downstream components of the power train 12. In certain applications, in contrast, it may be useful to provide a sudden or "ballistic" increase in supplemental power. For example, when supplemental power is needed immediately the controller 32 may direct a sudden release of energy from the energy storage device 26 (e.g., though the step-change actuation of a solenoid valve or other control device). In this way, a sudden (e.g., step-change) increase in power may be provided from the supplemental power device 28 to downstream components the power train 12.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A power train for a vehicle including an engine and a crank shaft receiving power directly from the engine, the power train comprising:
a power conversion device receiving power from one or more of the engine and a first other component of the vehicle;
an energy storage device receiving power from the power conversion device;
a control device configured to regulate the flow of power at least one of into and out of the energy storage device;
a supplemental power device receiving power from the energy storage device and providing power to an output component of the supplemental power device;
a supplemental power coupling between the supplemental power device and one or more of the crank shaft and a second other component of the vehicle, the second other component of the vehicle also receiving power directly from the engine;
a one-way power transfer device between the supplemental power device and the supplemental power coupling, the one-way power transfer device transmitting power from the output component of the supplemental power device to the supplemental power coupling and thereby to the one or more of the crank shaft and the second other component of the vehicle;
wherein the power conversion device includes a first continuously variable power source configured to receive rotational power from the engine and convert the received rotational power to a different form; and
wherein the supplemental power device includes a second continuously variable power source configured to receive power in the different form and convert the received power to rotational power to supplement the rotational power from the engine during transient high torque demands.

2. The power train of claim 1, wherein the first continuously variable power sources include a first electrical machine and the second continuously variable power sources include a second electrical machine; and
wherein the energy storage device includes an electrical energy storage device.

3. The power train of claim 1, wherein the first continuously variable power sources include a first hydraulic machine and the second continuously variable power sources include a second hydraulic machine; and
wherein the energy storage device includes a hydraulic accumulator.

4. The power train of claim 1, wherein the energy storage device includes a mechanical energy storage device.

5. The power train of claim 1, wherein the one-way power transfer device includes an over-running clutch.

6. The power train of claim 5, wherein the over-running clutch includes one of a sprag clutch and a mechanical diode.

7. The power train of claim 1, wherein the supplemental power coupling includes a plurality of gears.

8. The power train of claim 7, wherein the plurality of gears are included in a planetary gear set.

9. A vehicle with an engine and a crank shaft receiving power directly from the engine, the vehicle comprising:
a power conversion device receiving power from one or more of the engine and a first other component of the vehicle;
an energy storage device receiving power from the power conversion device;
a control device configured to regulate the flow of power at least one of into and out of the energy storage device;
a supplemental power device receiving power from the energy storage device and providing power to an output component of the supplemental power device;
a supplemental power coupling between the supplemental power device and one or more of the crank shaft and a second other component of the vehicle, the second other component of the vehicle also receiving power directly from the engine; and
a one-way power transfer device between the supplemental power device and the supplemental power coupling, the one-way power transfer device transmitting power from the output component of the supplemental power device to the supplemental power coupling and thereby to the one or more of the crank shaft and the second other component of the vehicle;
wherein the power conversion device includes a first continuously variable power source configured to receive rotational power from the engine and convert the received rotational power to a different form; and
wherein the supplemental power device includes a second continuously variable power source configured to receive power in the different form and convert the received power to rotational power to supplement the rotational power from the engine during transient high torque demands.

10. The vehicle of claim 9, wherein the first continuously variable power sources include a first electrical machine and the second continuously variable power sources include a second electrical machine; and
wherein the energy storage device includes an electrical energy storage device.

11. The vehicle of claim 9, wherein the first continuously variable power sources include a first hydraulic machine and the second continuously variable power sources include a second hydraulic machine; and
wherein the energy storage device includes a hydraulic accumulator.

12. The vehicle of claim 9, wherein the energy storage device includes a mechanical energy storage device.

13. The vehicle of claim 9, wherein the one-way power transfer device includes an over-running clutch.

14. The vehicle of claim 13, wherein the over-running clutch includes one of a sprag clutch and a mechanical diode.

15. The vehicle of claim 9, wherein the supplemental power coupling includes a plurality of gears.

16. The power train of claim 15, wherein the plurality of gears are included in a planetary gear set.

* * * * *